(12) United States Patent
Suzuki et al.

(10) Patent No.: US 11,966,968 B2
(45) Date of Patent: Apr. 23, 2024

(54) INFORMATION PROCESSING SYSTEM FOR SCHEDULING, DISPATCH, AND RETURN OF RENTAL ARTICLES

(71) Applicants: TOYOTA JIDOSHA KABUSHIKI KAISHA, Toyota (JP); DENSO CORPORATION, Kariya (JP)

(72) Inventors: Yukari Suzuki, Setagaya-ku (JP); Naoki Yamada, Toyota (JP); Toshihiro Arai, Nagoya (JP); Kuniaki Jinnai, Nagoya (JP); Keiichi Uno, Chita-gun (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 818 days.

(21) Appl. No.: 16/943,055

(22) Filed: Jul. 30, 2020

(65) Prior Publication Data
US 2021/0035202 A1    Feb. 4, 2021

(30) Foreign Application Priority Data
Jul. 30, 2019    (JP) .................................. 2019-140016

(51) Int. Cl.
*G06Q 30/0645*    (2023.01)
*B60W 60/00*    (2020.01)
(Continued)

(52) U.S. Cl.
CPC ... *G06Q 30/0645* (2013.01); *B60W 60/00256* (2020.02); *G06Q 10/06311* (2013.01);
(Continued)

(58) Field of Classification Search
CPC ............. G06Q 10/08; G06Q 30/0645; G06Q 10/0832; G06Q 10/08355
See application file for complete search history.

(56) References Cited

U.S. PATENT DOCUMENTS 11,263,579 B1 *    3/2022    Siegel ................ G06Q 10/0832
2004/0054600 A1 *   3/2004    Shike ..................... G07B 15/00
                                                                705/26.7
(Continued)

FOREIGN PATENT DOCUMENTS

JP    7-225878 A    8/1995
JP    2002-098448 A    4/2002
(Continued)

OTHER PUBLICATIONS

Cohen, Boyd; Muñoz, Pablo, "Sharing cities and sustainable consumption and production: towards an integrated framework", 2016, Journal of Cleaner Production, vol. 134, Part A, pp. 87-97 (Year: 2016).*

*Primary Examiner* — Jeff Zimmerman
*Assistant Examiner* — Wayne S. Murray
(74) *Attorney, Agent, or Firm* — Oblon, McClelland, Maier & Neustadt, L.L.P.

(57) ABSTRACT

A server according to the present disclosure determines a vehicle dispatch schedule of a vehicle for delivery of a rental article to a user and/or for collection of a rental article rented out to a user from the user. The server includes a communication interface for acquiring, from a terminal apparatus used by the user, first information regarding the rental article, and at least one of second information regarding a rental date/time and a rental location and third information regarding a return date/time and a return location; and a controller for determining, according to the second information, a vehicle dispatch schedule for delivering the rental article indicated by the first information to the user by the vehicle, and/or for determining, according to the third information, a vehicle dispatch schedule for collecting the rental article rented out to the user from the user by the vehicle.

1 Claim, 4 Drawing Sheets

(51) Int. Cl.
*G06Q 10/0631* (2023.01)
*G06Q 10/0832* (2023.01)
*G06Q 10/0835* (2023.01)
*G08G 1/00* (2006.01)

(52) U.S. Cl.
CPC ... *G06Q 10/0832* (2013.01); *G06Q 10/08355* (2013.01); *G08G 1/202* (2013.01)

(56) References Cited

U.S. PATENT DOCUMENTS

| | | | |
|---|---|---|---|
| 2007/0282618 A1* | 12/2007 | Barahona | G06Q 10/08355 705/338 |
| 2008/0040208 A1* | 2/2008 | Foth | G06Q 10/08 705/12 |
| 2018/0158018 A1* | 6/2018 | Luckay | G05D 1/0027 |
| 2019/0035044 A1* | 1/2019 | Ferguson | G05D 1/0223 |

FOREIGN PATENT DOCUMENTS

| | | | | |
|---|---|---|---|---|
| JP | 2011-186766 A | 9/2011 | | |
| JP | 2017-134545 A | 8/2017 | | |
| JP | 2017-215880 A | 12/2017 | | |
| JP | 2019-028600 A | 2/2019 | | |
| JP | 2019-106135 A | 6/2019 | | |
| KR | 102023090 B1 * | 11/2019 | | G06Q 50/28 |

\* cited by examiner

| RENTAL ARTICLE IDENTIFIER | RENTAL INFORMATION | | RETURN INFORMATION | |
|---|---|---|---|---|
| | RENTAL DATE/TIME | RENTAL LOCATION | RETURN DATE/TIME | RETURN LOCATION |
| ** | ** | ** | ** | ** |

INFORMATION PROCESSING SYSTEM FOR SCHEDULING, DISPATCH, AND RETURN OF RENTAL ARTICLES

CROSS-REFERENCE TO RELATED APPLICATION

The present application claims priority to Japanese Patent Application No. 2019-140016 filed on Jul. 30, 2019, the entire contents of which are incorporated herein by reference.

TECHNICAL FIELD

The present disclosure relates to a server, an information processing system, and an information processing method.

BACKGROUND

As an example, JP 2019-028600 A (PTL 1) describes a rental system including a plurality of automatic rental machines, and a server connected to the plurality of automatic rental machines via a network. In this rental system, the plurality of automatic rental machines each accommodate articles such as mobile chargers or umbrellas, and rent out an accommodated article in response to a rental request from a user. Furthermore, the server manages rental and return of articles in each of the plurality of automatic rental machines, and collects a fee depending on whether a rented-out article is returned within a specified period.

CITATION LIST

Patent Literature

PTL 1: JP 2019-028600 A

SUMMARY

According to the rental system described in PTL 1, a user can only rent articles that are accommodated in an automatic rental machine and only at a location where the automatic rental machine is installed. In addition, the user can return the rented-out articles only at the location where the automatic rental machine is installed.

In some cases, a sudden need for an article may arise at a travel destination, a business trip destination or the like, resulting in a desire to rent the article. For example, a user may suddenly want to rent a bicycle at a travel destination to go on an unplanned cycling trip. In such a case, because the rental system described in PTL 1 allows rental/return of limited articles at limited locations, there is a problem in that convenience is low in relation to rental/return of articles desired by a user.

An object of the present disclosure made in view of the problem as described above is to provide a server, an information processing system, and an information processing method by which convenience of rental/return of articles desired by users can be improved.

A server according to an aspect of the present disclosure is a server for determining a vehicle dispatch schedule of a vehicle for delivery, to a user, of a rental article that the user wants to rent, and/or collection, from the user, of a rental article rented out to the user, the server including:

an acquisition interface for acquiring, from a terminal apparatus used by the user, first information regarding the rental article, and at least one of second information regarding a rental date/time and a rental location of the rental article and third information regarding a return date/time and a return location of the rental article; and a controller for determining, according to the second information, a vehicle dispatch schedule for delivering the rental article indicated by the first information to the user by the vehicle, and/or for determining, according to the third information, a vehicle dispatch schedule for collecting the rental article rented out to the user from the user by the vehicle.

An information processing system according to an aspect of the present disclosure is an information processing system including a terminal apparatus that is used by a user, and a server for determining a vehicle dispatch schedule of a vehicle for delivery, to the user, of a rental article that is an article that the user wants to rent, and/or collection, from the user, of a rental article rented out to the user, where the terminal apparatus is configured receive, from the user, input of first information regarding the rental article, and input of at least one of second information regarding a rental date/time and a rental location of the rental article and third information regarding a return date/time and a return location of the rental article, and transmits the first information and at least one of the second information and the third information, to the server, and the server is configured to:
acquire the first information and at least one of the second information and the third information that are transmitted from the terminal apparatus, and
determine, according to the second information, a vehicle dispatch schedule for delivering the rental article indicated by the first information to the user by the vehicle, and/or determine, according to the third information, a vehicle dispatch schedule for collecting the rental article rented out to the user from the user by the vehicle.

An information processing method according to an aspect of the present disclosure is an information processing method that is performed by a server for determining a vehicle dispatch schedule of a vehicle for delivery, to a user, of a rental article that is an article that the user wants to rent, and/or for collection, from the user, of a rental article rented out to the user, the method including:

acquiring, from a terminal apparatus used by the user, first information regarding the rental article, and at least one of second information regarding a rental date/time and a rental location of the rental article and third information regarding a return date/time and a return location of the rental article; and determining, according to the second information, a vehicle dispatch schedule for delivering the rental article indicated by the first information to the user by the vehicle, and/or determining, according to the third information, a vehicle dispatch schedule for collecting the rental article rented out to the user from the user by the vehicle.

According to an aspect of the present disclosure, convenience of rental/return of articles desired by users may be improved.

DETAILED DESCRIPTION

Hereinafter, an embodiment of the present disclosure will be described with reference to the drawings. In the drawings, the same reference signs are used to indicate same or equivalent constitutive elements.

Figure 1:
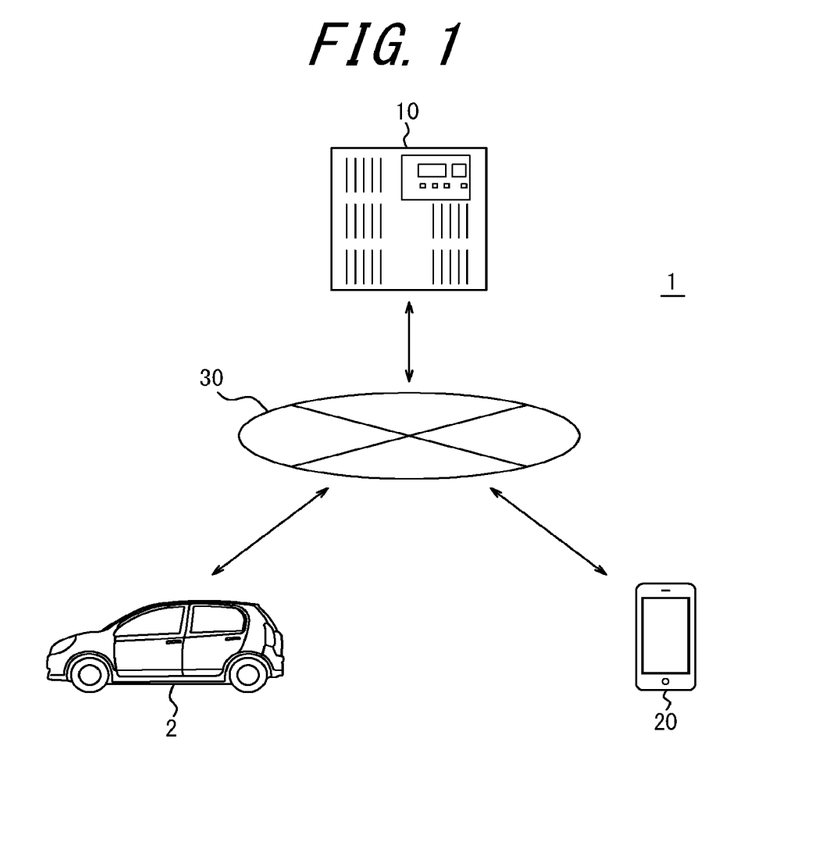
FIG. 1 is a diagram illustrating an example configuration of an information processing system according to an embodiment of the present disclosure.

FIG. 1 is a diagram illustrating an example configuration of an information processing system 1 according to an embodiment of the present disclosure. The information processing system 1 according to the present embodiment relates to provision of a rental service for renting out articles desired by users and collecting rented-out articles, through use of a vehicle 2 carrying articles that can be rented to the users.

The information processing system 1 according to the present embodiment includes a server 10 and a terminal apparatus 20. The server 10 and the terminal apparatus 20 are communicably connected to a network 30, which may include a mobile communication network, the Internet and the like, for example. The server 10 includes one or a plurality of server apparatuses. For example, the terminal apparatus 20 may be, but is not limited to, a smartphone, a smart speaker, a personal computer (PC) or the like, and may be any apparatus that is used by a user.

First, an outline of the present embodiment will be described, with details given later. The terminal apparatus 20 receives, from a user, input of information (first information) regarding a rental article, which is an article that the user wants to rent. Furthermore, the terminal apparatus 20 receives input of at least one of information (second information) regarding a rental date/time and a rental location of the rental article and information (third information) regarding a return date/time and a return location of the rental article. Then, the terminal apparatus 20 transmits the first information and at least one of the second information and the third information that have been input, to the server 10.

The server 10 acquires the first information and at least one of the second information and the third information that are transmitted from the terminal apparatus 20. Then, the server 10 determines, according to the second information, a vehicle dispatch schedule for delivering the rental article to the user by the vehicle 2 which carries the rental article indicated by the acquired first information, and/or determines, according to the third information, a vehicle dispatch schedule for collecting the rental article from the user by the vehicle 2.

According to such a configuration, the rental article that is indicated by the first information may be delivered by the vehicle 2 to the rental location and at the rental date/time indicated by the second information, or a rented-out rental article may be collected by the vehicle 2 at the return date/time and at the return location indicated by the third information. Accordingly, rental/return of an article desired by a user may be performed at a date/time and a location desired by the user, and the convenience of rental/return of an article desired by a user may be improved.

Next, each element of the information processing system 1 will be described in detail.

First, a description of the vehicle 2 will be given.

The vehicle 2 carries articles that can be rented out to users (such as clothing, shoes, bicycles, or baby buggies). The vehicle 2 delivers, according to the vehicle dispatch schedule determined by the server 10, an article (rental article) that a user wants to rent, to the rental location desired by the user and at the rental date/time desired by the user. Furthermore, the vehicle 2 collects, according to the vehicle dispatch schedule determined by the server 10, a rental article which was rented out to a user, at the return location desired by the user and at the return date/time desired by the user.

The vehicle 2 may be a dedicated vehicle to which articles of a specific type are loaded in advance, or a vehicle with respect to which articles to be loaded can be changed. In cases in which the vehicle 2 is a dedicated vehicle, the vehicle dispatch schedule is determined for the vehicle 2 to which the rental article is already loaded. Furthermore, in cases in which the vehicle 2 is a vehicle with respect to which the articles to be loaded can be changed, the vehicle dispatch schedule for the vehicle 2 is determined after changing the articles loaded to the vehicle 2 according to the rental article.

The vehicle 2 may include an autonomous driving function for automatically performing vehicle control on the basis of control information from an external source. In the present embodiment, "autonomous driving" includes automation of some or all of the user operations for driving a vehicle. For example, autonomous driving may encompass levels 1 to 5 defined by the Society of Automotive Engineers (SAE). Furthermore, the vehicle 2 may include an on-board communication device, and may be connected to the network 30 by the on-board communication device in the manner illustrated in FIG. 1. At least a part of an application programming interface (API) defining the specifications for control information is disclosed to a service provider that provides services using vehicles which include the autonomous driving function. The service provider can freely program autonomous driving control software using the disclosed API. Accordingly, the service provider may provide any mobility service (such as the rental service according to the present embodiment) by installing facilities, in accordance with a given purpose, in a cabin space of the vehicle which includes the autonomous driving function and by programming autonomous driving control software using the API in accordance with the given purpose. In cases in which the vehicle 2 includes the autonomous driving function, the vehicle 2 may receive the vehicle dispatch schedule determined by the server 10, and perform autonomous driving on the basis of the received vehicle dispatch schedule.

As described above, the terminal apparatus 20 receives, from a user, input of information (first information) regarding a rental article. Furthermore, the terminal apparatus 20 receives input of at least one of information (second information) regarding a rental date/time and a rental location of the rental article and information (third information) regarding a return date/time and a return location of the rental article. The terminal apparatus 20 transmits the first information and at least one of the second information and the third information that have been input, to the server 10.

The terminal apparatus 20 may be configured in any manner, providing it includes functionality for performing communication via the network 30, functionality for receiving inputs from a user, functionality for displaying various pieces of information, and the like. The configuration of a terminal apparatus 20 having such functionality is well known, and a description thereof is therefore omitted.

Next, a configuration of the server 10 will be described.

Figure 2:
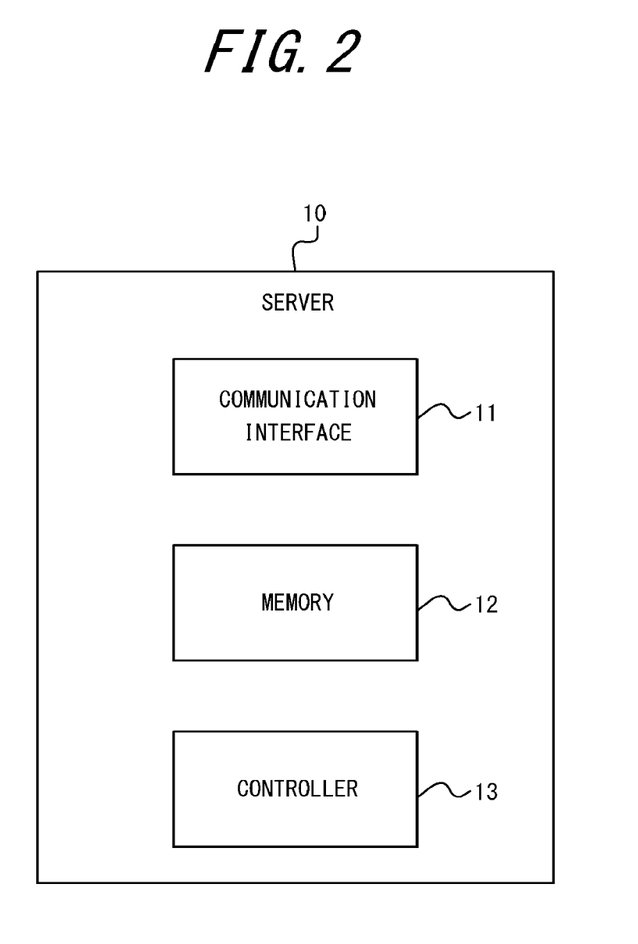
FIG. 2 is a diagram illustrating an example configuration of a server illustrated in FIG. 1.

FIG. 2 is a diagram illustrating an example configuration of the server 10 according to the present embodiment.

The server 10 illustrated in FIG. 2 includes a communication interface 11, a memory 12, and a controller 13. The communication interface 11 is an example of an acquisition interface.

The communication interface 11 includes one or more communication modules that are connected to the network 30. For example, the communication modules may be compatible with mobile communication standards such as 4th Generation (4G) and 5th Generation (5G) standards, wired local area network (LAN) standards, or wireless LAN standards, but the communication modules may be compatible with any communication standards without being limited to the above. In the present embodiment, the server 10 is connected to the network 30 via the communication interface 11. The communication interface 11 receives (acquires) the first information and at least one of the second information and the third information that are transmitted from the terminal apparatus 20 via the network 30.

For example, the memory 12 may be, but is not limited to, a main memory, an auxiliary memory, or a cache memory. The memory 12 stores any information that is used in operation of the server 10. For example, the memory 12 may store a system program, an application program, a database, and the like. Information that is stored in the memory 12 may be updated by information that is acquired from the network 30 via the communication interface 11, for example.

Figure 3:
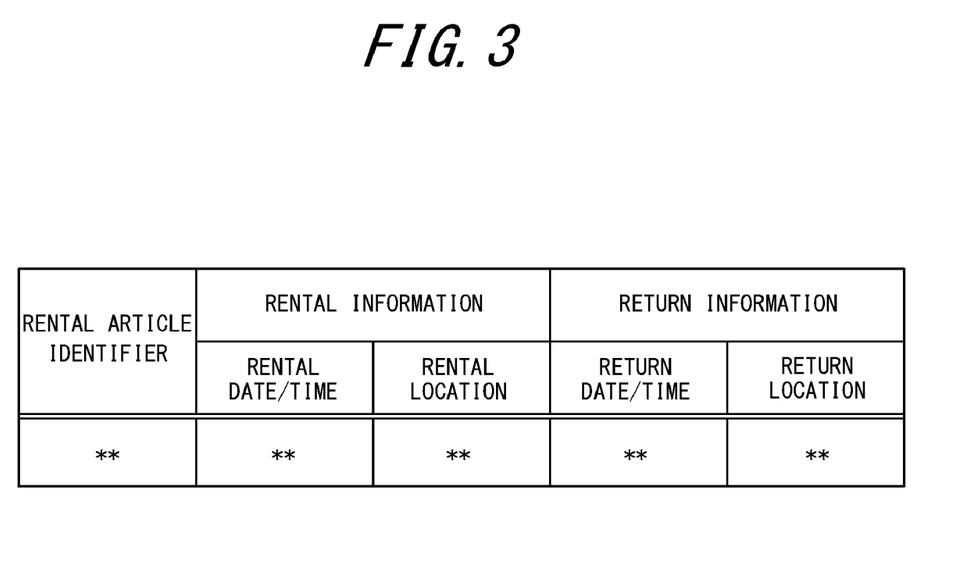
FIG. 3 is a diagram illustrating an example of information that is stored in a memory illustrated in FIG. 2.

An example of information that is stored in the database in the memory 12 will be described with reference to FIG. 3. In the present embodiment, a rental article identifier, rental information, and return information are stored in the database in association with one another.

The rental article identifier is an identifier (such as a name or an article number) for identifying a rental article. The rental article identifier is registered in the database in the memory 12 on the basis of the first information received from the terminal apparatus 20.

The rental information includes information regarding the rental date/time when a user desires to rent a rental article, and the rental location where the user desires to rent the rental article. The rental information is registered in the database in the memory 12 on the basis of the second information received from the terminal apparatus 20.

The return information includes information regarding the return date/time when the user desires to return the rental article, and the return location where the user desires to return the rental article. The return information is registered in the database in the memory 12 on the basis of the third information received from the terminal apparatus 20.

Referring back to FIG. 2, the controller 13 includes one or more processors. In the present embodiment, a "processor" may be, but is not limited to, a general-purpose processor or a dedicated processor dedicated to specific processing. The controller 13 controls operation of the entire server 10. Details of the operation of the server 10 that is controlled by the controller 13 will be given later.

Next, operation of the server 10 and the terminal apparatus 20 will be described. First, operation of the terminal apparatus 20 will be described.

Figure 4:
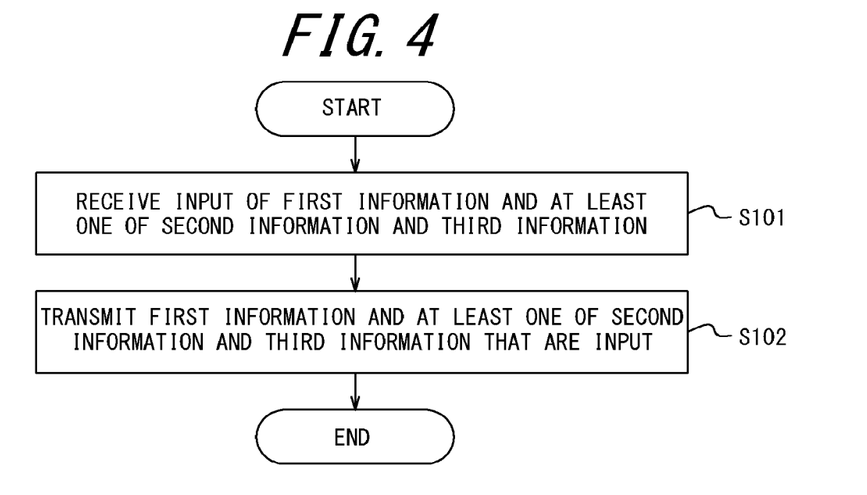
FIG. 4 is a flowchart illustrating an example operation of a terminal apparatus illustrated in FIG. 1.

FIG. 4 is a flowchart illustrating example operation of the terminal apparatus 20.

The terminal apparatus 20 receives input, from a user, of the first information regarding a rental article, and also, of at least one of the second information regarding the rental date/time and the rental location of the rental article and the third information regarding the return date/time and the return location of the rental article (step S101). The rental article, the rental date/time, the rental location, the return date/time, and the return location may be input, for example, by starting an application, installed in the terminal apparatus 20, used for placing an order to rent a desired article (hereinafter referred to as "rental ordering application"). When the rental ordering application is started, the terminal apparatus 20 displays an input screen to be used for input of the rental article, the rental date/time, the rental location, the return date/time, the return location, and the like. The terminal apparatus 20 receives input of the first information, and input of at least one of the second information and the third information, on the basis of input of the user according to the input screen.

Additionally, there may be cases in which the date/time and the location where an article is desired to be rented out are decided, but the date/time and the location where the article is to be returned are not yet decided. In this case, the user may place an order to rent the rental article by inputting the first information regarding the rental article and the second information regarding the rental date/time and the rental location, for example. Then, the user may input the third information regarding the return date/time and the return location upon deciding the date/time and the location for returning the rental article.

Furthermore, there may also be cases in which the date/time and the location where a rented-out article is to be returned are decided, but the date/time and the location where the article is desired to be rented out are not yet decided. In this case, the user may place an order to rent the rental article by inputting the first information regarding the rental article and the third information regarding the return date/time and the return location, for example. Then, the user may input the second information regarding the rental date/time and the rental location upon deciding the date/time and the location where the rental article is desired to be rented out.

Furthermore, an identifier may be assigned to an order from a user for a rental article, and the identifier may be shared between the server 10 and the terminal apparatus 20 according to transmission of the first to the third information from the terminal apparatus 20 to the server 10. This enables the server 10 to associate the first to the third information transmitted from the terminal apparatus 20 with one another even in a case in which the second information or the third information is transmitted at a later time point, as in the examples described above, by transmitting the information together with the identifier, for example.

When input of the first information and at least one of the second information and the third information is received, the terminal apparatus 20 transmits, to the server 10 via the network 30, the first information and at least one of the second information and the third information that have been input (step S102).

Figure 5:
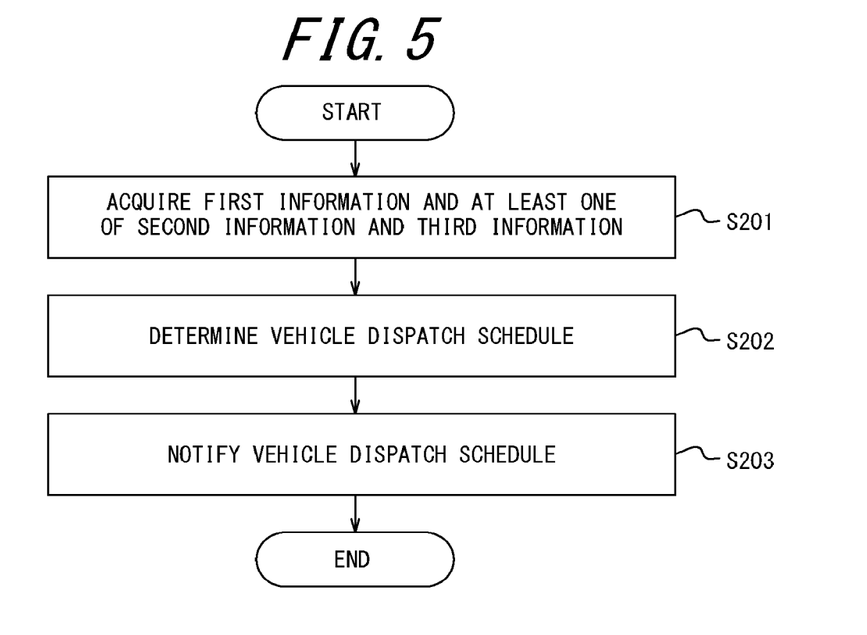
FIG. 5 is a flowchart illustrating an example operation of the server illustrated in FIG. 1.

Next, operation of the server 10 will be described. FIG. 5 is a diagram for describing an information processing method of the server 10 according to the present embodiment, and is a flowchart illustrating example operations of the server 10.

The communication interface 11 receives (acquires) the first information and at least one of the second information and the third information that are transmitted from the terminal apparatus 20 via the network 30 (step S201).

The controller 13 determines, according to the second information, the vehicle dispatch schedule for delivering a rental article indicated by the first information acquired by the communication interface 11 to the user by the vehicle 2 carrying the rental article. Furthermore, the controller 13 determines, according to the third information, the vehicle dispatch schedule for collecting the rental article from the user (step S202). Then, the controller 13 notifies of the determined vehicle dispatch schedule to a management apparatus or the like managing dispatch of the vehicle 2 (step S203). Moreover, in cases in which the vehicle 2 is capable of connecting to the network 30 via an on-board communication device, the controller 13 may transmit the determined vehicle dispatch schedule for the vehicle 2 to the vehicle 2 via the network 30. Furthermore, in cases in which the vehicle 2 includes the autonomous driving function, the vehicle 2 may perform autonomous driving according to the vehicle dispatch schedule, when the vehicle dispatch schedule is received from the server 10.

The controller 13 refers to the rental information and the return information stored in the database in the memory 12, and in a case in which it is possible to visit a plurality of places (rental locations or return locations) by the times (rental date/times or return date/times) that are associated with each location, a vehicle dispatch schedule which causes one vehicle 2 to visit the plurality of locations may be determined.

Furthermore, the controller 13 may set, as rental fees for rental articles, different fees according to rental dates/times or return dates/times, or according to rental locations or return locations. For example, in cases in which the rental date/time or the return date/time is late at night or early in the morning, the controller 13 may set a higher fee for rental of a rental article than in cases in which the rental date/time or the return date/time is during the daytime. Moreover, for example, in cases in which the rental location or the return location is a location to which the vehicle 2 takes a relatively long time to access, the controller 13 may set a higher fee for rental of a rental article than normal.

In cases in which the rental fees for rental of rental articles are different depending on the rental date/time or the return date/time, or on the rental location or the return location, the controller 13 may notify the terminal apparatus 20 of a fee according to the first to the third information acquired from the terminal apparatus 20, and may accept an order for rental of the rental article indicated by the first information, when a response to the effect that the fee is acceptable is received from the terminal apparatus 20, for example.

As described above, in the information processing system 1 according to the present embodiment, the terminal apparatus 20 receives, from a user, input of the first information regarding a rental article, which is an article the user wants to rent, and input of at least one of the second information regarding the rental date/time and the rental location of the rental article and the third information regarding the return date/time and the return location of the rental article, and transmits the first information and at least one of the second information and the third information that have been input, to the server 10. The server 10 acquires the first information and at least one of the second information and the third information that are transmitted from the terminal apparatus 20, and determines, according to the second information, the vehicle dispatch schedule for delivering the rental article indicated by the acquired first information to the user by the vehicle 2, and/or determines, according to the third information, the vehicle dispatch schedule for collecting the rental article rented out to the user from the user by the vehicle 2.

According to such a configuration, a rental article indicated by the first information may be delivered by the vehicle 2 to the rental location and at the rental date/time that are indicated by the second information, and the rental article may be collected by the vehicle 2 at the return location and at the return date/time that are indicated by the third information. Accordingly, a user may rent or return an article of the user's choice at a date/time and a location of the user's choice, and thus, convenience of rental/return of articles desired by users may be improved.

The embodiment described above is given as a typical example, but those skilled in the art will readily recognize that many modifications and substitutions may be made within the spirit and scope of the present disclosure. Accordingly, the present disclosure should not be interpreted as being limited to the embodiment described above, and various alterations and modifications may be made without departing from the scope of the claims. For example, a plurality of structural blocks illustrated in a configuration diagram of the embodiment may be combined into one, or one structural block may be divided into several blocks.

Furthermore, for example, one or more general-purpose information processing apparatuses, such as a smartphone or a computer, may be caused to function as the server 10 according to the embodiment described above. Specifically, a program describing processing instructions for implementing each function of the server 10 according to the embodiment is stored in a memory of the information processing apparatus, and a processor of the information processing apparatus reads out and executes the program. Accordingly, the disclosure of the present embodiment may also be implemented as a program that is executable by a processor, or as a non-transitory computer-readable recording medium recording such a program.

Furthermore, in addition to the example given above, the network 30 according to the present embodiment may be one or a combination of an ad hoc network, a metropolitan area network (MAN), a cellular network, a wireless personal area network (WPAN), a public switched telephone network (PSTN), a terrestrial wireless network, an optical network, or another network. Structural elements of a wireless network include an access point (such as a Wi-Fi access point), a femtocell, and the like, for example. Moreover, a wireless communication appliance may be connected to a wireless network that uses Wi-Fi® (Wi-Fi is a registered trademark in Japan, other countries, or both), Bluetooth® (Bluetooth is a registered trademark in Japan, other countries, or both), a cellular communication technology, or other wireless technologies and technology standards.

As described above, various aspects of the present disclosure may be embodied in various different modes, and the modes are all included in the scope of the present embodiment.

The invention claimed is:

1. An information processing system, comprising:
a terminal apparatus in which a rental ordering application to be used by a user for placing an order to rent a rental article is installed;

a vehicle having an application programming interface, having autonomous vehicle facilities installed in a cabin space of the vehicle, being configured to carry the rental article, and having autonomous driving control software programmed by a rental service provider to perform autonomous vehicle control for delivering and collecting the rental article by using the application programming interface; and a server including a database, wherein the terminal apparatus is configured to:

upon start-up of the rental ordering application, display an input screen to be used for input of first information regarding the rental article, second information regarding a rental date and time and a rental location, and third information regarding a return date and time and a return location;

receive, from the user via the input screen:

input of the first information regarding the rental article, and input of:

both (1) the second information regarding the rental date and time and the rental location of the rental article and (2) the third information regarding the return date and time and the return location of the rental article, or only the second information regarding the rental date and time and the rental location of the rental article;

upon receipt of the input of the first information regarding the rental article, transmit the first information regarding the rental article to the server;

upon receipt of the input of both (1) the second information regarding the rental date and time and the rental location of the rental article and (2) the third information regarding the return date and time and the return location of the rental article, transmit (1) the second information regarding the rental date and time and the rental location of the rental article and (2) the third information regarding the return date and time and the return location of the rental article at once to the server; and upon receipt of the input of only the second information regarding the rental date and time and the rental location of the rental article, transmit the second information regarding the rental date and time and the rental location of the rental article without the third information regarding the return date and time and the return location of the rental article to the server, the server is configured to:

upon receipt of the first information regarding the rental article:

register, in the database, a rental article identifier for identifying the rental article; and share the rental article identifier with the terminal apparatus, the terminal apparatus is configured to, after transmission of the second information regarding the rental date and time and the rental location of the rental article without the third information regarding the return date and time and the return location of the rental article to the server and upon receipt of input of the third information regarding the return date and time and the return location of the rental article, transmit the third information regarding the return date and time and the return location of the rental article together with the rental article identifier to the server, the server is configured to:

when (1) the second information regarding the rental date and time and the rental location of the rental article and (2) the third information regarding the return date and time and the return location of the rental article are received at once, store both (i) rental information and (ii) return information in the database in association with the rental article identifier, the rental information including information regarding the rental date and time and the rental location, and the return information including information regarding the return date and time and the return location;

when the second information regarding the rental date and time and the rental location of the rental article is received without the third information regarding the return date and time and the return location of the rental article:

store the rental information in the database in association with the rental article identifier, and then:

upon receipt of the third information regarding the return date and time and the return location of the rental article together with the rental article identifier, further store the return information in the database in association with the rental article identifier;

refer to the rental information stored in the database in association with the rental article identifier, so as to determine a vehicle dispatch schedule for delivering the rental article identified by the rental article identifier to the user by the vehicle;

refer to the return information stored in the database in association with the rental article identifier, so as to determine a vehicle dispatch schedule for collecting the rental article identified by the rental article identifier from the user by the vehicle; and provide at least one of the vehicle dispatch schedule for delivering the rental article and the vehicle dispatch schedule for collecting the rental article to the vehicle, and the vehicle having the application programming interface, having the autonomous vehicle facilities installed in the cabin space, being configured to carry the rental article, and having the autonomous driving control software programmed by the rental service provider to perform the autonomous vehicle control for delivering and collecting the rental article by using the application programming interface is configured to:

receive the at least one of the vehicle dispatch schedule for delivering the rental article and the vehicle dispatch schedule for collecting the rental article; and perform the autonomous vehicle control to autonomously move the vehicle to at least one of the rental location and the return location based on the at least one of the vehicle dispatch schedule for delivering the rental article and the vehicle dispatch schedule for collecting the rental article so as to autonomously deliver and/or collect the rental article.

* * * * *